(12) United States Patent
Fukuda et al.

(10) Patent No.: US 7,082,905 B2
(45) Date of Patent: Aug. 1, 2006

(54) COOLING APPARATUS FOR HYBRID VEHICLE

(75) Inventors: Kenji Fukuda, Tochigi-ken (JP); Hideo Kimura, Saitama (JP); Naoki Hotta, Tochigi-ken (JP); Noriyuki Abe, Utsunomiya (JP); Tetsuya Hasebe, Utsunomiya (JP); Osamu Saito, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 10/760,428

(22) Filed: Jan. 21, 2004

(65) Prior Publication Data

US 2004/0163861 A1    Aug. 26, 2004

(30) Foreign Application Priority Data

Feb. 24, 2003    (JP)    ............................ P2003-045881

(51) Int. Cl.
*B60K 6/02*    (2006.01)
(52) U.S. Cl. .................. 123/41.31; 123/41.01
(58) Field of Classification Search ............. 123/41.31, 123/41.01, 41.02, 41.1
See application file for complete search history.

(56) References Cited

U.S. PATENT DOCUMENTS

| | | | | |
|---|---|---|---|---|
| 3,792,690 A | * | 2/1974 | Cooper ........................ | 123/3 |
| 6,196,168 B1 | | 3/2001 | Eckerskorn et al. | |
| 6,601,545 B1 | * | 8/2003 | Hohl ........................ | 123/41.31 |
| 6,604,515 B1 | * | 8/2003 | Marsh et al. ................ | 123/563 |
| 6,655,325 B1 | * | 12/2003 | Botti et al. .................... | 123/3 |
| 6,705,254 B1 | * | 3/2004 | Grabowski et al. ...... | 123/41.29 |
| 6,810,977 B1 | * | 11/2004 | Suzuki ...................... | 180/65.2 |

FOREIGN PATENT DOCUMENTS

| | | | |
|---|---|---|---|
| EP | 1 108 572 A2 | | 6/2001 |
| JP | 07-253020 | | 10/1995 |
| JP | 10-266855 | * | 6/1998 |
| JP | 10-238345 | | 9/1998 |
| JP | 10-259721 | | 9/1998 |
| JP | 11-022460 | | 1/1999 |
| JP | 11-107748 | | 4/1999 |
| JP | 11-132040 | | 5/1999 |
| JP | 11-313406 | | 11/1999 |
| JP | 2001-206050 | | 7/2001 |

(Continued)

*Primary Examiner*—Noah P. Kamen
*Assistant Examiner*—Jason Benton
(74) *Attorney, Agent, or Firm*—Westerman, Hattori, Daniels & Adrian, LLP.

(57) ABSTRACT

In order to appropriately control the temperature state of multiple equipment having differing management temperatures, while preventing complication of the apparatus structure, a cooling apparatus for a hybrid vehicle is provided with a seventh flow path 30g which flows coolant which has flowed only through a main flow path 22a of a radiator 22 to a water jacket 25 via a first thermostat 23 which has an induction temperature set relatively high; an eighth flow path 30h which flows coolant which has flowed through the main flow path 22a and a sub flow path 22b of the radiator 22 to the water jacket 25 via a second thermostat 24 which has an induction temperature set relatively low, and also supplies the coolant to a PDU 14 and a downverter 15; and a bypass flow path 30j which connects a fifth flow path 30e which supplies coolant discharged from the water jacket 25 to the radiator 22, and a position of the eighth flow path 30h on a downstream side of the second thermostat 24.

10 Claims, 8 Drawing Sheets

FOREIGN PATENT DOCUMENTS

| JP | 2002-223505 | 8/2002 |
| JP | 2002-227644 | 8/2002 |
| JP | 2002-276362 | 9/2002 |
| JP | 2002-276364 | 9/2002 |

* cited by examiner

COOLING APPARATUS FOR HYBRID VEHICLE

BACKGROUND OF THE INVENTION

Priority is claimed on Japanese Patent Application No. 2003-045881, filed Feb. 24, 2003, the content of which is incorporated herein by reference.

FIELD OF THE INVENTION

This invention relates to a cooling apparatus for a hybrid vehicle driven by an internal combustion engine and a motor.

DESCRIPTION OF THE RELATED ART

Heretofore, for a radiator installed in a cooling circuit which flows coolant for cooling the engine, there is known an apparatus (for example, see Patent Literature 1) in which there is provided an additional flow path in addition to the main flow path within the radiator, through which one part of the coolant which has flowed within this radiator is diverted so as to flow through the radiator a second time, and which controls the temperature of working fluid such as ATF (Automatic Transmission Fluid) or the like, by means of coolant which has flowed through this additional flow path, that is, the coolant which is of a relatively low temperature due to the flow path within the radiator being extended, compared to the coolant flowing through the main flow path.

[Patent Literature]
U.S. Pat. No. 6,196,168.

In a conventional hybrid vehicle provided with a motor, which together with an internal combustion engine is the driving source of the vehicle, it is necessary to cool the electrical equipment of a high voltage system, which comprises the motor and an inverter which supplies power to the motor, and so on, in addition to cooling the internal combustion engine.

However, there are cases where the management temperatures for the internal combustion engine and for the electrical equipment of the high voltage system differ from each other, and even in the case where coolant is discharged at multiple differing temperatures by means of a radiator according to conventional technology such as that described above for example, when an independent cooling circuit system is provided for each of these multiple coolants, problems occur due to the apparatus structure being complicated and the loading of the vehicle being impaired.

SUMMARY OF THE INVENTION

The present invention takes the above situation into consideration, with an object of providing a cooling apparatus for a hybrid vehicle in which it is possible to appropriately control the temperature state of multiple equipment having differing management temperatures, while preventing complication of the apparatus structure.

In order to achieve the objective and solve the above problems, the first aspect of the present invention provides a cooling apparatus for a hybrid vehicle comprising; a motor, the hybrid vehicle having a motor for driving the hybrid vehicle, a motor control device (for example, the PDU14 in the embodiment) for controlling the operation of the motor, and an internal combustion engine for driving the vehicle, and the cooling apparatus comprising a cooling circuit (for example, each of the flow paths 30a, 30b, 30c, 30d, 30e, 30f, 30g, and 30h in the embodiment) containing a coolant and the cooling circuit cooling the internal combustion engine and cooling the motor control device, and a temperature setting device (for example, the radiator 22, the first thermostat 23, and the second thermostat 24 in the embodiment) for setting independently a temperatures a management temperature of the internal combustion engine and the management temperature of the said motor control device.

According to the cooling apparatus for a hybrid vehicle of the above structure, when controlling the temperature state by flowing common coolant through the internal combustion engine and the motor control device, by setting the desired temperature state set for the internal combustion engine and the motor control device, that is the management temperature, to mutually different temperatures, it is possible to perform appropriate temperature management for each of the internal combustion engine and the motor control device, while preventing complication of the apparatus structure.

According to the second aspect, in the above cooling apparatus for a hybrid vehicle the cooling apparatus comprises a radiator provided with a plurality of flow paths (for example, the main flow path 22a and the sub flow path 22b in the embodiment) for radiating heat of said internal combustion engine and the motor, the temperature setting device sets said management temperatures independently by flowing the coolant through each of said plurality of flow paths.

According to the above cooling apparatus for a hybrid vehicle, by providing a plurality of flow paths within the radiator, constituting different flow paths for the coolant, then for example the longer the path length of the flow path, the more the temperature of the coolant is reduced, and the temperature of the coolant discharged from the radiator can be set to the desired temperature. As a result, multiple cooling targets, for example the temperature state of the internal combustion engine and the motor control device, can be easily controlled to a desired management temperature by a single radiator, without the need to provide for example, multiple independent radiators and cooling circuits. According to the third aspect, in the above cooling apparatus for a hybrid vehicle an output shaft of said internal combustion engine and an output shaft of said motor are mechanically connected.

According to the cooling apparatus for a hybrid vehicle of the above structure, the water pump which circulates coolant through the cooling circuit can be driven by the driving force of the internal combustion engine and the motor to which it is mechanically connected, coolant can be circulated with respect to both the internal combustion engine and the motor control device by a common water pump, and the apparatus structure can be simplified.

According to the fourth aspect, in the above cooling apparatus for a hybrid vehicle, the cooling apparatus comprises a plurality of thermostats having induction temperatures differ from each other, (for example, the first thermostat 23 and the second thermostat 24 in the embodiment) and each management temperature is independently set at temperature by means of said plurality of thermostats.

According to the cooling apparatus for a hybrid vehicle of the above structure, by arranging the plurality of thermostats whose induction temperatures differ from each other, in predetermined positions in the cooling circuit, coolant at the desired temperature can be flowed through the desired flow paths, and the internal combustion engine and the motor control device can be more or less independently controlled to each of the desired management temperatures.

Moreover, a cooling apparatus for a hybrid vehicle according to a fifth aspect of the present invention is characterized in that there is provided: a circulation path (for example, each of the flow paths 30a, 30b, 30c, 30d, and 30f in the embodiment) having a water jacket provided in an interior of the internal combustion engine and a water pump which circulates coolant to the water jacket; a radiator having a plurality of flow paths (for example, the main flow path 22a and the sub flow path 22b in the embodiment) constituting different flow paths for the coolant; a supply path (for example, the fifth flow path 30e in the embodiment) which branches off from the circulation path at a position on a downstream side of the water jacket and which flows the coolant to the radiator; a first flow path (for example, the seventh flow path 30g in the embodiment) which flows the coolant to the circulation path from the radiator via a first thermostat which has an induction temperature set relatively high; a second flow path (for example, the eighth flow path 30h in the embodiment) which flows the coolant to the circulation path from the radiator via a second thermostat which has an induction temperature set relatively low, and also supplies the coolant to the motor control device; and a bypass flow path (for example, the bypass flow path 30j in the embodiment) which connects the supply flow path to a position on a downstream side of the second thermostat of the second flow path.

According to the cooling apparatus for a hybrid vehicle of the above structure, for example when warming up the internal combustion engine and so on, by setting the first thermostat and second thermostat to a closed state, the coolant circulates bypassing the radiator, and the amount of time required to raise the internal combustion engine to the desired temperature can be shortened.

Furthermore, accompanying an increase in the temperature of the coolant flowing through the circulation path, when the temperature of the coolant supplied from the supply flow path to the downstream side of the second thermostat via the bypass flow path increases above a predetermined induction temperature, the second thermostat opens, and the coolant flows from the radiator to the motor control device by means of the second flow path. Here, by setting the coolant flowing through the second flow path so as to be discharged from the flow path amongst the plurality of flow paths provided within the radiator, for which the flow path is relatively long, then for example the motor control device can be controlled to a desired temperature state which is lower than that of the internal combustion engine.

Moreover, when the temperature of the coolant flowing through the circulation path increases, the first thermostat opens, and the coolant flows from the radiator to the circulation path by means of the first flow path. Here, by setting the coolant flowing through the first flow path so as to be discharged from the flow path amongst the plurality of flow paths provided within the radiator, for which the flow path is relatively short, then for example the internal combustion engine can be controlled to a desired temperature state which is higher than that of the motor control device.

Furthermore, a cooling apparatus for a hybrid vehicle according to a sixth aspect of the present invention is characterized in that the second thermostat is arranged in a position on a downstream side of the motor control device.

According to the cooling apparatus for a hybrid vehicle of the above structure, for example when warming up the internal combustion engine and so on, by setting the first thermostat and second thermostat to a closed state, because the coolant circulates bypassing the radiator and the motor control device, any increase in the thermal capacity in the system through which the coolant flows is suppressed, so that the amount of time required when raising the internal combustion engine to the desired temperature can be shortened even further.

Moreover, a cooling apparatus for a hybrid vehicle according to a seventh aspect of the present invention is characterized in that the motor is arranged in a position on a downstream side of the motor control device in the second flow path, and the second thermostat is arranged in a position between the motor control device and the motor and is connected to the bypass flow path.

According to the cooling apparatus for a hybrid vehicle of the above structure, even if the second thermostat is in a closed state, the coolant flowing through the bypass flow path flows into the circulation path after being supplied to the motor. Therefore, for example when warming up the internal combustion engine and so on, by supplying the internal combustion engine with coolant which is of a relatively high temperature due to heat exchange with the operating motor, the internal combustion engine can be raised to the desired temperature much earlier.

Also, in the case where the second thermostat is arranged in a position on the downstream side in the vicinity of the motor control device, temperature management of the motor control device can be accurately performed, and for example the occurrence of overheating or the like can be reliably prevented.

Moreover, a cooling apparatus for a hybrid vehicle according to an eighth aspect of the present invention is characterized in that the second thermostat is arranged in a position on an upstream side of the motor control device.

According to the cooling apparatus for a hybrid vehicle of the above structure, even if the second thermostat is in a closed state, the coolant flowing through the bypass flow path flows into the circulation path after being supplied to the motor control device and the motor. Therefore, for example when warming up the internal combustion engine and so on, by supplying the internal combustion engine with coolant which is of a relatively high temperature due to heat exchange with the operating motor control device and motor, the internal combustion engine can be raised to the desired temperature much earlier.

Also, for example even if localized overheating occurs inside the motor control device or the motor due to limited flow at the second thermostat and so on, by increasing the amount of coolant flowing through the bypass flow path, each of the temperature distributions inside the motor control device and the motor can be evened out.

Moreover, a cooling apparatus for a hybrid vehicle according to a ninth aspect of the present invention is characterized in that there is provided: a circulation path (for example, each of the flow paths 30a, 30b, 30c, 30d, and 30f in the embodiment) having a water jacket provided in an interior of the internal combustion engine and a water pump which circulates coolant to the water jacket; a radiator having a plurality of flow paths (for example, the main flow path 22a and the sub flow path 22b in the embodiment) constituting different flow paths for the coolant; a supply path (for example, the fifth flow path 30e in the embodiment) which branches off from the circulation path at a position on a downstream side of the water jacket and which flows the coolant to the radiator; a first flow path (for example, the seventh flow path 30g in the embodiment) which flows the coolant to the circulation path from the radiator via a first thermostat which has an induction temperature set relatively high; a second flow path (for example, the eighth flow path 30h in the embodiment) which flows the coolant to the circulation path from the radiator via a second thermostat which has an induction temperature set relatively low, and also supplies the coolant to the motor control device; and a bypass flow path (for example, the bypass flow path 30k in the embodiment) which connects a position on an upstream side of the water jacket of the circulation path between the water pump and the water jacket, to a position on a downstream side of the second thermostat of the second flow path.

According to the cooling apparatus for a hybrid vehicle of the above structure, the coolant supplied to the position on the downstream side of the second thermostat via the bypass flow path is coolant which has been diverted just before the water jacket, and the influence of the temperature state of the internal combustion engine on the operating state of the second thermostat is thus suppressed.

As a result, even in the case for example where the temperature of the coolant after passing through the water jacket fluctuates depending on load fluctuations of the internal combustion engine, the occurrence of malfunctions such as the second thermostat opening too early and so on can be prevented, and the open/closed state of the second thermostat can be controlled to an appropriate timing.

Moreover, a cooling apparatus for a hybrid vehicle according to a tenth aspect of the present invention is characterized in that there is provided: a circulation path (for example, each of the flow paths 30a, 30b, 30c, 30d, and 30f in the embodiment) having a water jacket provided in an interior of the internal combustion engine and a water pump which circulates coolant to the water jacket; a radiator having a plurality of flow paths (for example, the main flow path 22a and the sub flow path 22b in the embodiment) constituting different flow paths for the coolant; a supply path (for example, the fifth flow path 30e in the embodiment) which branches off from the circulation path at a position on a downstream side of the water jacket and which flows coolant to the radiator; a first flow path (for example, the seventh flow path 30g in the embodiment) which flows the coolant to the circulation path from the radiator via a first thermostat which has an induction temperature set relatively high; and a second flow path (for example, the eighth flow path 30h in the embodiment) which flows the coolant to the circulation path from the radiator via a second thermostat which has an induction temperature set relatively low, and also supplies the coolant to the motor control device; and the second thermostat is arranged in the circulation path.

According to the cooling apparatus for a hybrid vehicle of the above structure, elimination of the need to provide a bypass flow path and so on to connect the supply flow path to the second flow path enables simplification of the apparatus structure.

DETAILED DESCRIPTION OF THE INVENTION

Hereunder, a first embodiment of a cooling apparatus for a hybrid vehicle of the present invention will be described, with reference to the appended drawings.

Figure 1:
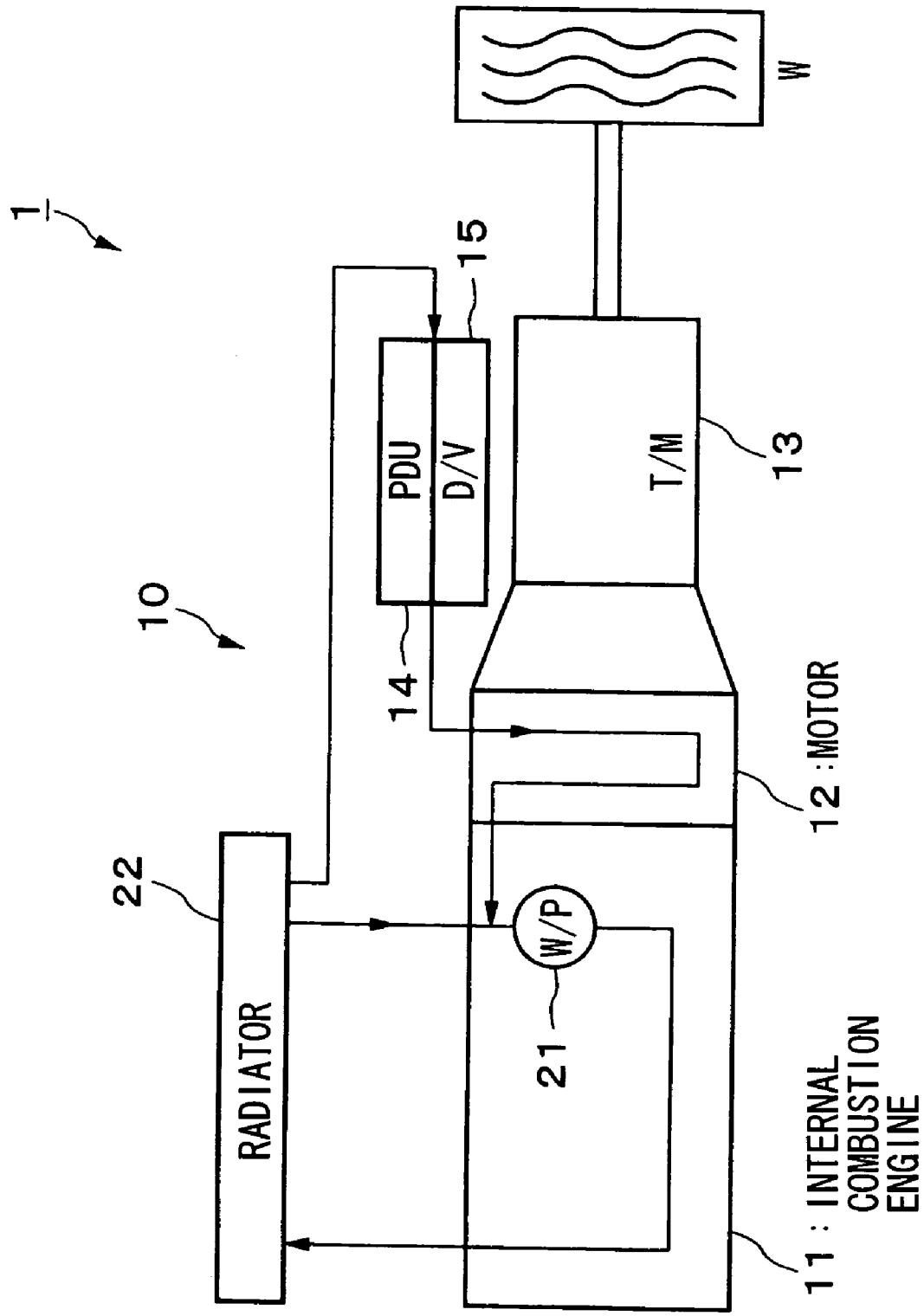
FIG. 1 is a schematic diagram of a cooling apparatus for a hybrid vehicle according to a first embodiment of the present invention.

A cooling apparatus for a hybrid vehicle 10 according to the first embodiment of the present invention, as for example shown in FIG. 1, is mounted in a hybrid vehicle 1 in which an internal combustion engine 11, a motor 12, and a transmission (T/M) 13 are connected in series. In this hybrid vehicle 1, for example the driving forces from both the internal combustion engine 11 and the propulsion motor 12, are transmitted to drive wheels W via the transmission (T/M) 13 such as a CVT, manual transmission or the like.

The motor 12 generates an auxiliary driving force which assists the driving force of the internal combustion engine 11 depending on the driving state of the hybrid vehicle 1. Furthermore, at the time of deceleration of the hybrid vehicle 1, when a driving force is transmitted to the motor 12 side from the wheels W side, the motor 12 functions as a generator to produce so called regenerative braking, and the kinetic energy of the vehicle is recovered as electrical energy.

The regenerative operation and driving of the motor 12 are performed by a PDU (power drive unit) 14, which receives control instructions from a motor control unit (omitted from figure). The PDU 14 is provided for example with an inverter made by bridge connection of switching elements comprising multiple transistors, and is connected to a storage device (omitted from figure) which has batteries and so on of a high voltage system which performs transfer of electrical energy with the motor 12.

Furthermore, a 12 volt auxiliary battery (not shown) for driving various auxiliary equipment of the hybrid vehicle 1 is connected to the storage device of this high voltage system via a downverter (D/V) 15 which comprises a DC-DC converter, and the downverter 15 reduces the voltage of the storage device to charge the auxiliary battery.

In this hybrid vehicle 1, the PDU 14 and the downverter 15 are arranged for example in the vicinity of the transmission 13.

Figure 2:
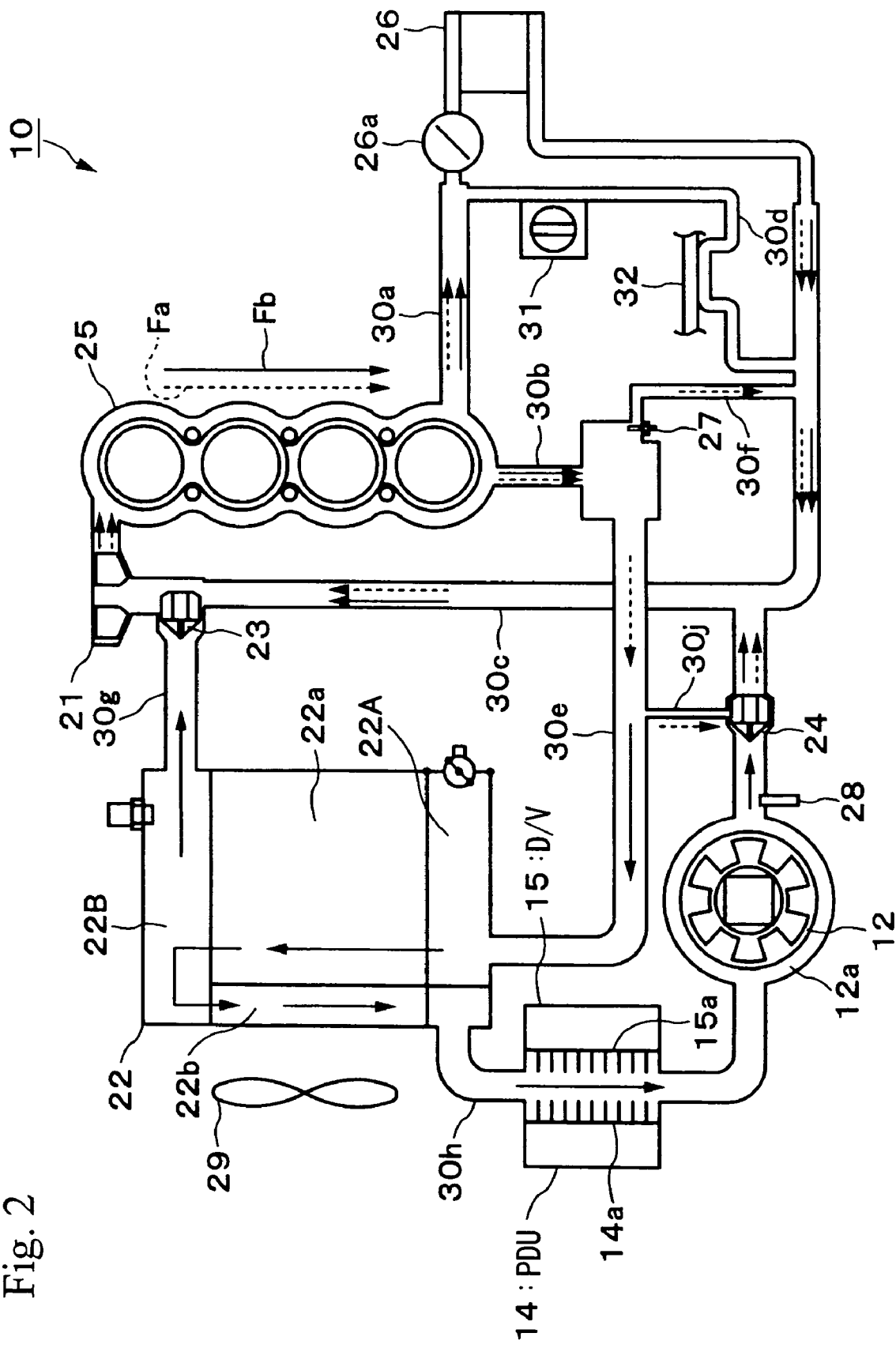
FIG. 2 is a diagram showing a structure of a cooling apparatus for a hybrid vehicle according to the first embodiment of the present invention.

The cooling apparatus 10 for a hybrid vehicle according to the present embodiment, as shown for example in FIG. 2, comprises; a water pump (W/P) 21 driven by the internal combustion engine 11, a radiator 22, a first thermostat 23, a second thermostat 24, a water jacket 25 in the interior of the internal combustion engine 11, a heater core 26, and first and second temperature sensors 27 and 28.

In this cooling apparatus 10 for a hybrid vehicle, the water jacket 25 is arranged on the downstream side of the water pump 21, for example, and the coolant, which having flowed through this water jacket 25 is of a relatively high temperature, flows through both first and second flow paths 30a and 30b.

The heater core 26 is connected to the first flow path 30a via an appropriate valve 26a, and this heater core 26 heats air using the relatively high temperature coolant as a heat source, and the coolant which has undergone an exchange of heat in this heater core 26 returns to the water pump 21 by means of a third flow path 30c.

Moreover, a fourth flow path 30d is provided connected to the first flow path 30a to bypass the valve 26a and the heater core 26 and connect to the third flow path 30c, and to also supply coolant to a throttle body 31, and a breather 32 forming a ventilator.

Furthermore, the second flow path 30b branches into a fifth flow path 30e which flows coolant to the radiator 22, and a sixth flow path 30f which is connected to the third flow path 30c and is formed with a smaller inner diameter than for example the fifth flow path 30e.

The first temperature sensor 27 is provided in the second flow path 30b, and detects the temperature of the coolant discharged from the water jacket 25.

The radiator 22 comprises; an inlet side tank 22A which is connected for example to the fifth flow path 30e, an outlet side tank 22B connected to a seventh flow path 30g which is connected to the third flow path 30c via the first thermostat 23, a main flow path 22a in the interior of the radiator which connects the inlet side tank 22A to the outlet side tank 22B, and a sub flow path 22b in the interior of the radiator which is connected to the outlet side tank 22B. Furthermore, an eighth flow path 30h which supplies coolant to each of the heat sink parts 14a and 15a of the PDU 14 and the downverter 15 arranged for example facing each other, and to the cooling flow path 12a of the motor 12, is connected to the sub flow path 22b, and this eighth flow path 30h is connected to the third flow path 30c via the second thermostat 24.

That is to say, the interior of the radiator 22 is partitioned into the main flow path 22a and the sub flow path 22b by means of partition plates and so on, and is constructed so that the main flow path 22a and the sub flow path 22b communicate by means of the outlet side tank 22B.

Moreover, coolant injected from the fifth flow path 30e into the inlet side tank 22A of the radiator 22 first flows through the main flow path 22a in the interior of the radiator 22, and is cooled to an appropriate first temperature (for example, approximately 80° C. or the like).

Next, at least one part of the coolant which has flowed through the main flow path 22a and been injected into the outlet side tank 22B, flows through the sub flow path 22b in the interior of the radiator 22, and by relatively extending the flow path in the interior of the radiator 22 it is possible to cool this to an appropriate second temperature (for example, approximately 60° C. or the like) which is lower than the first temperature.

Here, the second temperature sensor 28, which detects the temperature of the coolant discharged from the cooling flow path 12a of the motor 12, is provided in the eighth flow path 30h in a position on the downstream side of the motor 12, and in the case where the detection result output from this second temperature sensor 28 exceeds a predetermined temperature, a cooling fan 29 which cools the radiator 22 is set to operate.

Moreover, a bypass flow path 30j, formed with an inner diameter that is less than that of the fifth flow path 30e for example, and which is connected to the eighth flow path 30h, is provided in the fifth flow path 30e. This bypass flow path 30j is connected to the eighth flow path 30h in the vicinity of the second thermostat 24, so that the open/closed state of the second thermostat 24 can be controlled according to the temperature of the coolant flowing through this bypass flow path 30j, and it is also possible for the coolant to flow from the eighth flow path 30h to the bypass flow path 30j regardless of the open/closed state of the second thermostat 24.

The first and second thermostats 23 and 24 are set to change from a closed state to an open state when the temperature of the coolant is a high temperature exceeding each of the predetermined temperatures. The predetermined second set temperature (for example, approximately 65° C.) where the second thermostat 24 which performs temperature control mainly of the high voltage system is in an open state, is set to a lower temperature compared to the predetermined first set temperature (for example, approximately 82° C.) where the first thermostat 23 which performs temperature control mainly of the internal combustion engine 11 is in an open state.

The cooling apparatus 10 for a hybrid vehicle according to the present embodiment is provided with the above structure. Next the operation of the cooling apparatus 10 for a hybrid vehicle will be described.

In this cooling apparatus 10 for a hybrid vehicle, in the case where the temperature of the coolant is relatively low, such as for example when starting up the internal combustion engine 11 and so on, the first thermostat 23 and the second thermostat 24 are in a closed state, and for example as in the flow path Fa shown in FIG. 2 (for example, the dotted arrow Fa in FIG. 2), the coolant discharged from the water jacket 25 bypasses the radiator 22 to return to the water pump 21.

That is to say, the coolant discharged from the water jacket 25, flows in turn through the first flow path 30a, the heater core 26 or the fourth flow path 30d, and the third flow path 30c, or flows through the second flow path 30b, the sixth flow. path 30f or the fifth flow path 30e and the bypass flow path 30j, and the third flow path 30c, to return to the water pump 21.

Then, when the temperature of the coolant becomes higher than the predetermined second set temperature (for example, approximately 65° C.) the second thermostat 24 opens, and for example as in the flow path Fb shown in FIG. 2 (for example, the solid arrow Fb in FIG. 2), the coolant discharged from the water jacket 25 flows further to the radiator 22, and after being cooled as it were in two stages, by a process of flowing through the main flow path 22a and the sub flow path 22b of the radiator 22, is supplied to the PDU 14, the downverter 15, and the motor 12.

That is to say, the coolant discharged from the water jacket 25 flows in turn through the first flow path 30a, the fifth flow path 30e, the main flow path 22a and the sub flow path 22b of the radiator 22, the eighth flow path 30h, the second thermostat 24, and the third flow path 30c, and returns to the water pump 21.

Next, when the temperature of the coolant exceeds the predetermined first set temperature (for example, approximately 82° C.) the first thermostat 23 opens, and the coolant which has flowed through the main flow path 22a of the radiator 22 flows further from the seventh flow path 30g via the first thermostat 23 and through the third flow path 30c to return to the water pump 21.

According to the cooling apparatus 10 for a hybrid vehicle of the present embodiment, by providing both the main flow path 22a and the sub flow path 22b which communicates with this main flow path 22a in the interior of the single radiator 22 and enabling a reduction in the temperature of the coolant by as it were two stages, appropriate temperature management can be performed by means of common coolant with respect to the multiple systems with differing management temperatures, such as for example the internal combustion engine 11 and the high voltage system which is set to a relatively low temperature compared to the internal combustion engine 11 (for example, the PDU 14, the downverter 15, the motor 12 and so on), while keeping down the complexity of the apparatus structure and the coolant flow path.

Furthermore, by merging the coolant discharged from the multiple systems with differing management temperatures, on the upstream side of the single water pump 21, any deviation of the temperature state of each system from the desired state can be easily suppressed, while simplifying the apparatus structure.

Also, because the first thermostat 23 and the second thermostat 24 are provided, and the coolant is set to flow bypassing the radiator 22 and the high voltage system when for example the internal combustion engine 11 is warming up and so on, temperature raising characteristics can be improved when increasing the temperature of the. system to the desired temperature.

In the above embodiment, the coolant is supplied to the cooling flow path 12a of the motor 12 after cooling the PDU 14 and the downverter 15. However, the configuration is not limited to this, and may also be such that, for example the coolant flows to the second thermostat 24 bypassing the cooling flow path 12a of the motor 12, and the motor 12 is air-cooled.

Figure 3:
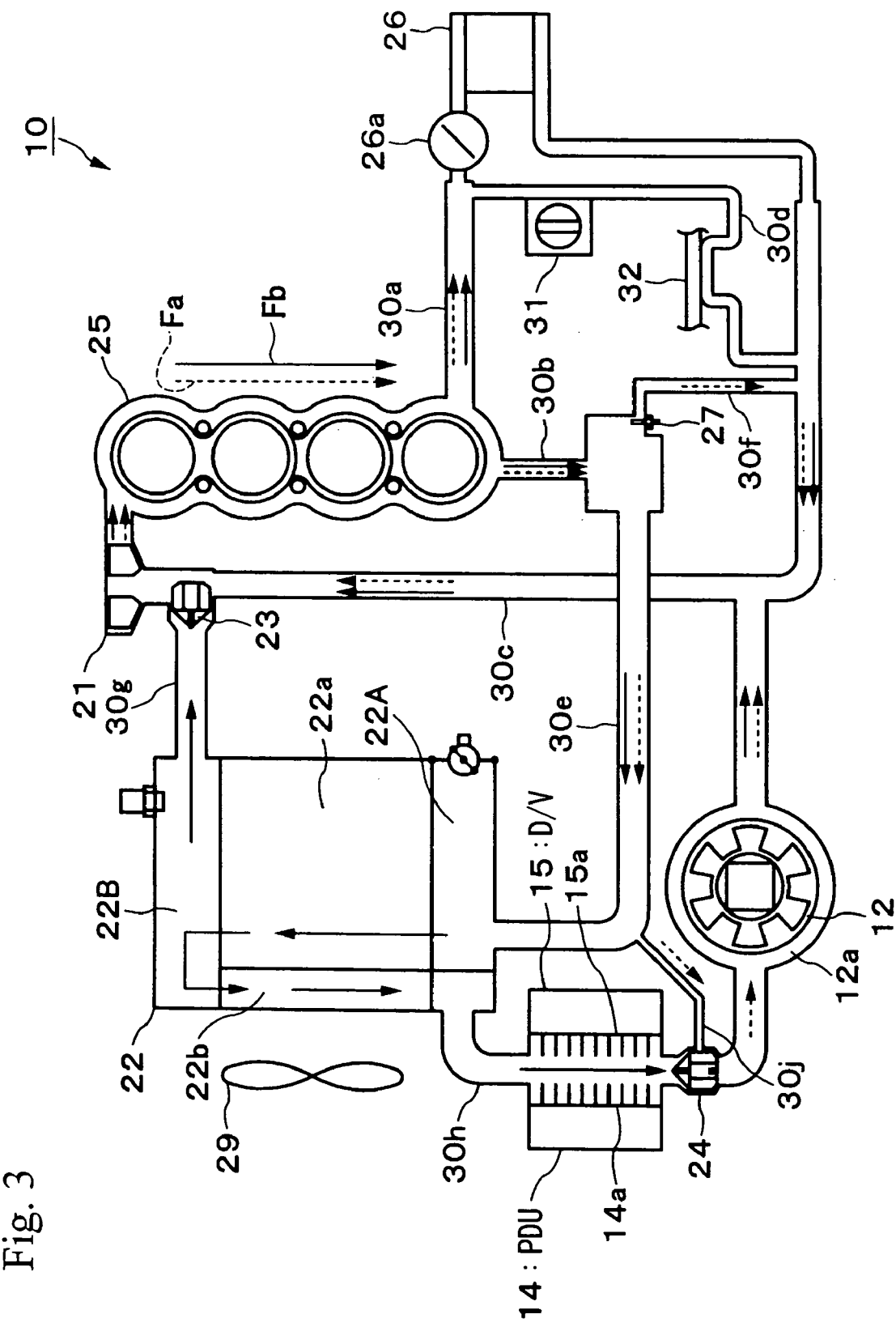
FIG. 3 is a diagram showing a structure of a cooling apparatus for a hybrid vehicle according to a first modified example of the present embodiment.

Also, in the above embodiment, the second thermostat 24 is arranged in the eighth flow path 30h in a position downstream of the motor 12. However, the configuration is not limited to this, and may also be such that as for example in a first modified example of the present embodiment shown in FIG. 3, this is arranged in a position downstream of each of the heat sink parts 14a and 15a of the PDU 14 and the downverter 15.

In this case, even if the second thermostat 24 is in a closed state, the coolant flowing through the bypass flow path 30j is injected into the water jacket 25 after flowing through the cooling flow path 12a of the motor 12. Therefore, for example when the hybrid vehicle 1 is starting up and so on, by means of the relatively high temperature coolant being supplied to the internal combustion engine 11 in a process in which it flows through the cooling flow path 12a of the motor 12 during operation, the internal combustion engine 11 can be raised to the desired temperature even earlier, and the amount of time required for warming up the internal combustion engine 11 can be shortened.

Moreover, by arranging the second thermostat 24 in a position downstream from the vicinity of the PDU 14 and the downverter 15, temperature management of the PDU 14 and the downverter 15, for example, can be accurately performed, and for example occurrences of overheating and so on can be reliably prevented.

Figure 4:
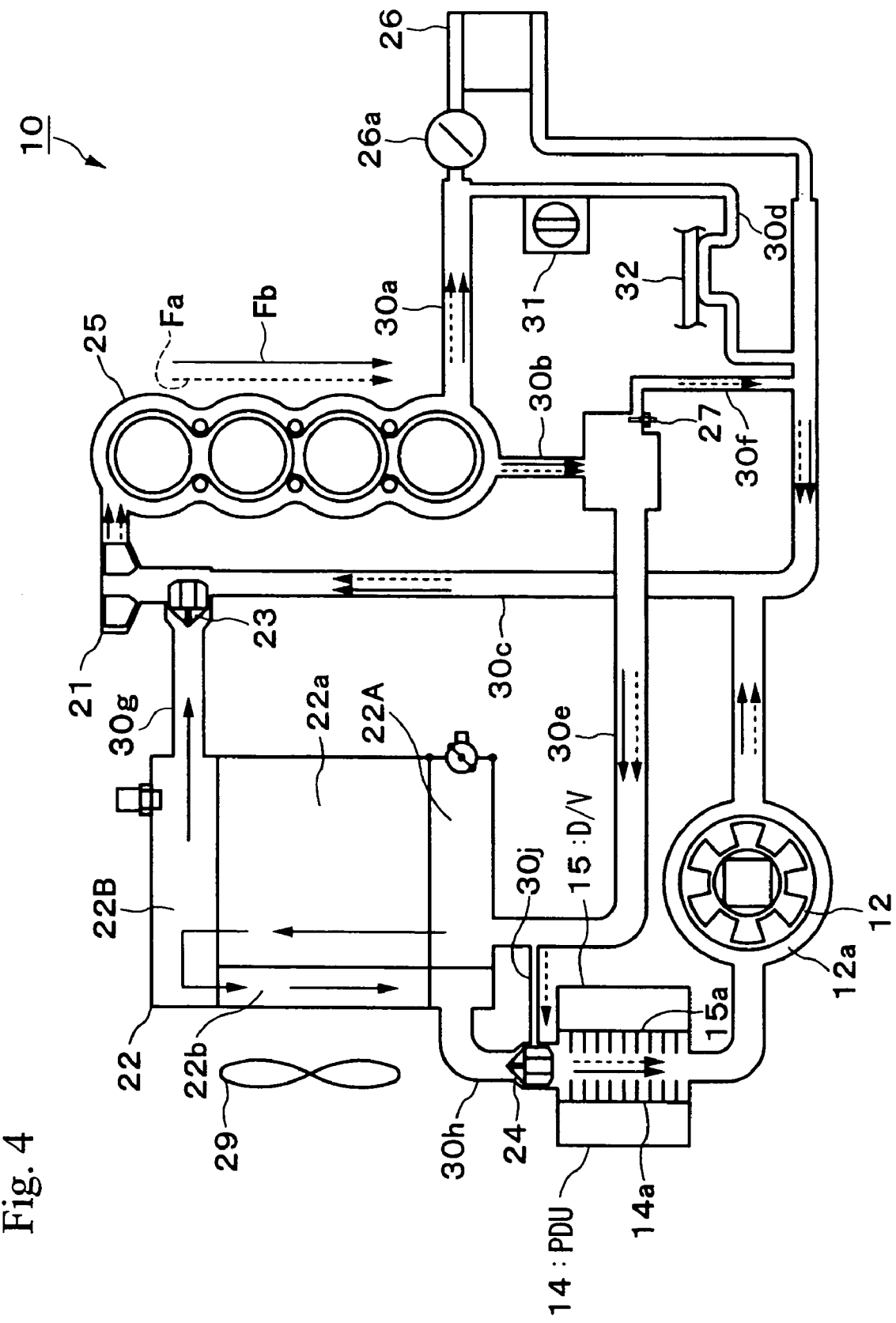
FIG. 4 is a diagram showing a structure of a cooling apparatus for a hybrid vehicle according to a second modified example of the present embodiment.

Furthermore, as for example in a second modified example of the present embodiment shown in FIG. 4, the second thermostat 24 may be arranged in the eighth flow path 30h in a position upstream from each of the heat sinks 14a and 15a of the PDU 14 and the downverter 15.

In this case, even if the second thermostat 24 is in a closed state, the coolant flowing through the bypass flow path 30j is injected into the water jacket 25 after it has flowed through each of the heat sink parts 14a and 15a of the PDU 14 and the downverter 15, and through the cooling flow path 12a of the motor 12. Therefore, for example when starting up the hybrid vehicle 1 and so on, by supplying the coolant to the internal combustion engine 11 at a relatively high temperature by means of a process in which it flows through each of the heat sink parts 14a and 15a of the PDU 14 and the downverter 15 during operation and through the cooling flow path 12a of the motor 12, the internal combustion engine 11 can be raised to the desired temperature even earlier, and the amount of time required for warming up the internal combustion engine 11 can be shortened even more.

Moreover, even in the case where localized overheating occurs in the interior of the PDU 14, the downverter 15 or the motor 12 due to limited flow and so on at the second thermostat 24 for example, by increasing the amount of coolant flowing through the bypass flow path 30j, each of the temperature distributions in the interior of the PDU 14, the downverter 15, and the motor 12 can be evened out.

Figure 5:
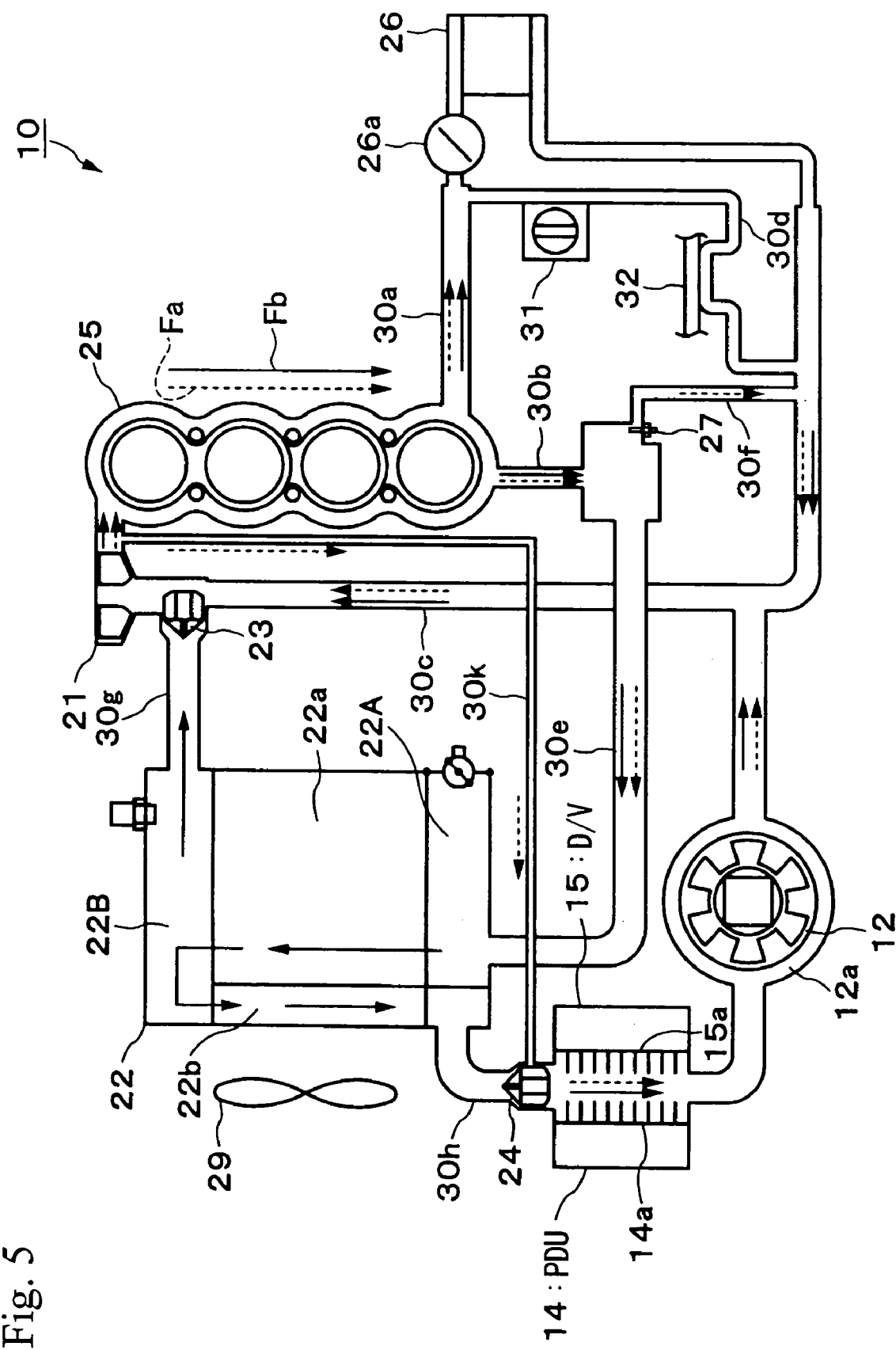
FIG. 5 is a diagram showing a structure of a cooling apparatus for a hybrid vehicle according to a third modified example of the present embodiment.

Also, in the above embodiment, the bypass flow path 30j connecting the fifth flow path 30e and the eighth flow path 30h is provided. However the configuration is not limited to this, and may be such that for example as in a third modified example of the present embodiment shown in FIG. 5, a bypass flow path 30k can be provided for connecting a position on the upstream side of the water jacket 25 and the eighth flow path 30h.

In this case, the coolant supplied to the second thermostat 24 via the bypass flow path 30k is coolant which has been diverted just before the water jacket 25, and the influence of the temperature state of the internal combustion engine 11 on the operating state of the second thermostat 24 is thus suppressed. For example, even in the case where the temperature of the coolant after flowing through the water jacket 25 fluctuates depending on load fluctuations of the internal combustion engine 11, the occurrence of malfunctions such as the second thermostat 24 opening too early and so on can be prevented, and the open/closed state of the second thermostat 24 can be controlled to an appropriate timing.

Figure 6:
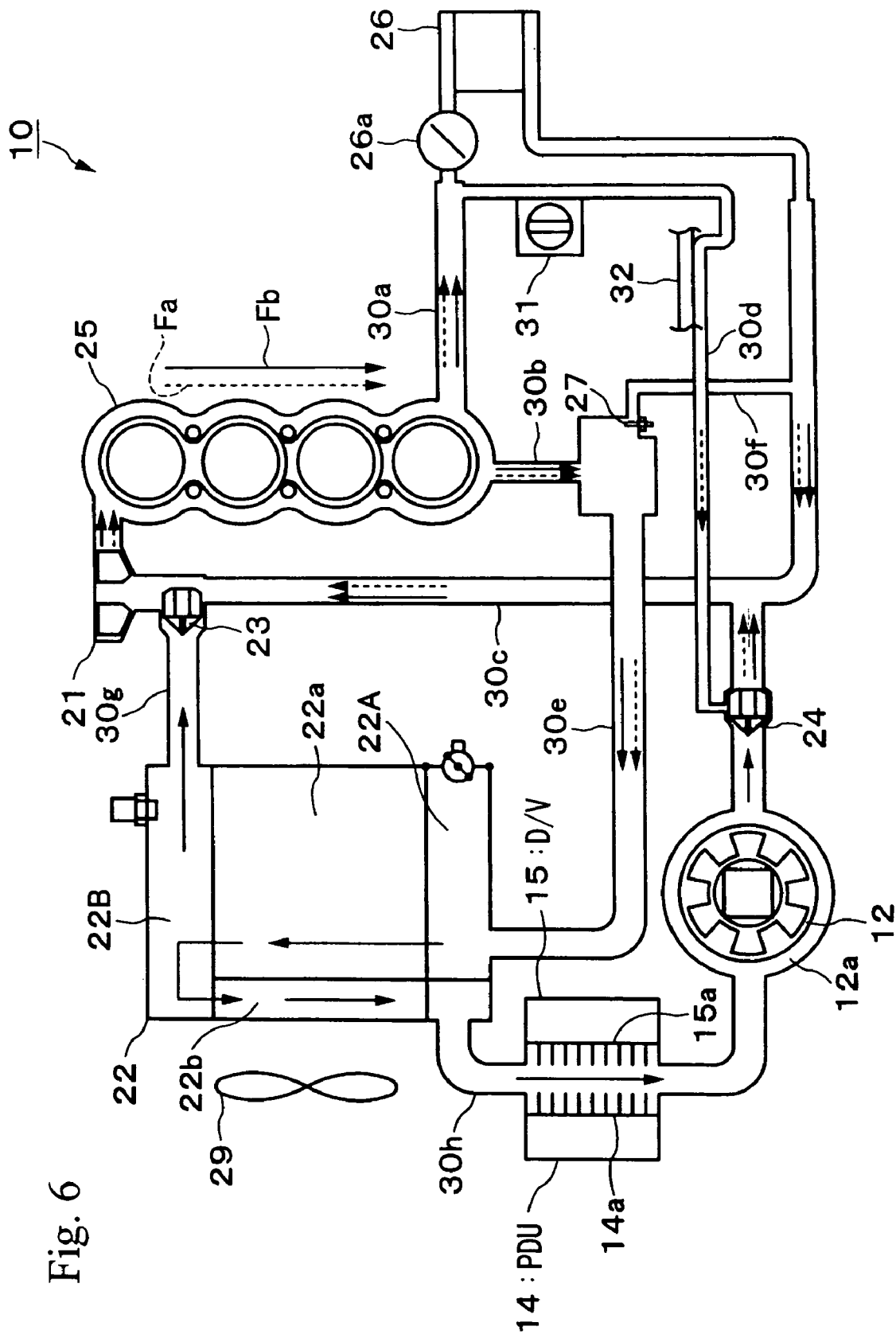
FIG. 6 is a diagram showing a structure of a cooling apparatus for a hybrid vehicle according to a fourth modified example of the present embodiment.

Also, in the above embodiment, the bypass flow path 30j connecting the fifth flow path 30e and the eighth flow path 30h is provided. However, the configuration is not limited to this, and may also be such that as for example in a fourth modified example of the present embodiment shown in FIG. 6 the fourth flow path 30d is connected to the eighth flow path 30h instead of the bypass flow path 30j.

In this case, it is possible to simplify the apparatus structure by omitting the bypass flow path 30j.

Figure 7:
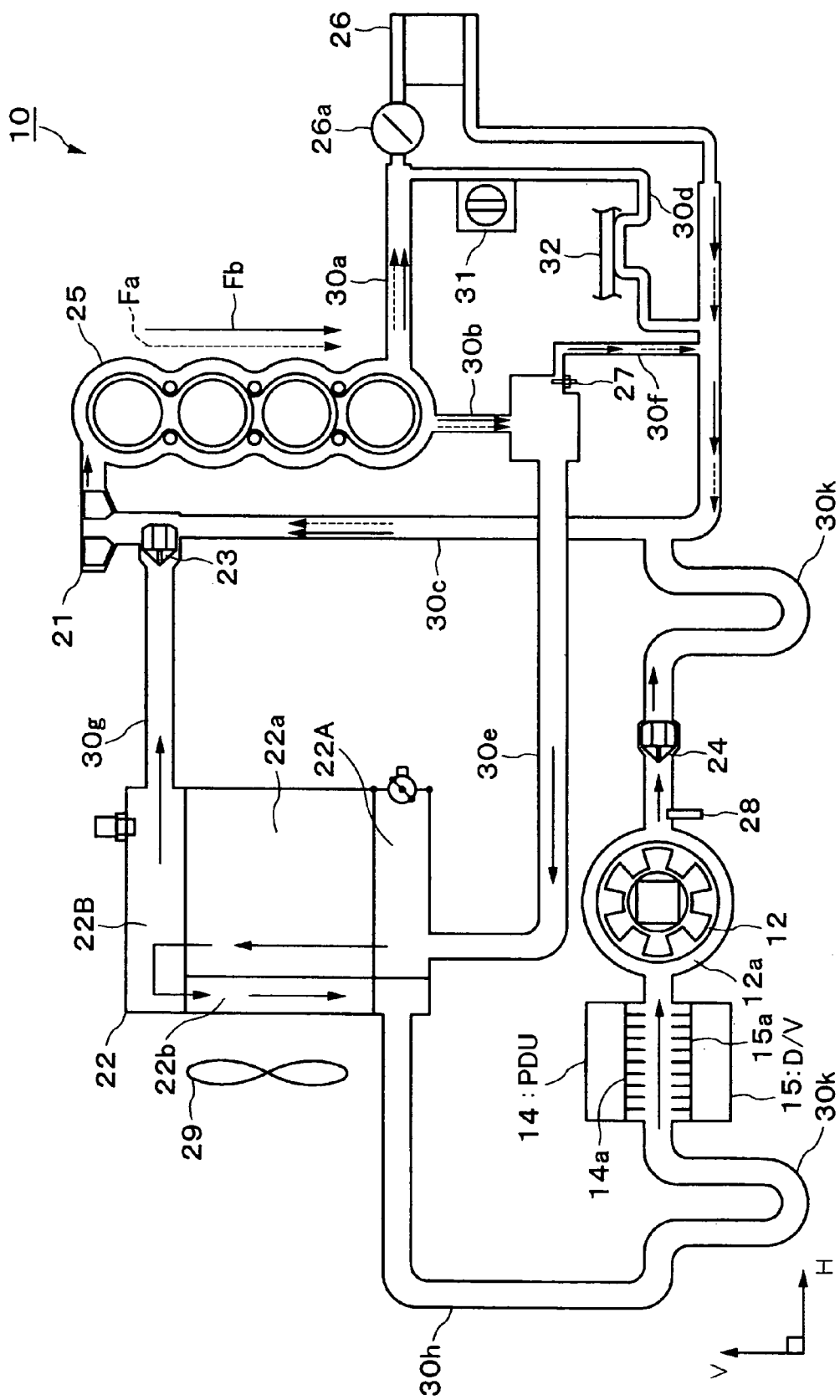
FIG. 7 is a diagram showing a structure of a cooling apparatus for a hybrid vehicle according to a fifth modified example of the present embodiment.

A fifth modified example of the above-described embodiment will be explained below with reference to FIG. 7 and FIG. 8.

In the cooling apparatus 10 according to the fifth modified example of the hybrid vehicle of the present invention, the main point which distinguishes the present example from the above-described other examples is that two U tubes 30k and 30k are provided, one of which is disposed at an upstream side of the PDU 14 and the downverter 15 in the eighth flow path 30h, and the other one of which is disposed at a downstream side of the second thermostat 24. Note that the bypass flow path 30j connecting the fifth flow path 30e and the eighth flow path 30h is omitted.

Each U tube is placed such that the U-shaped curved portion falls downward in the vertical direction (for example, the V direction) from the connection portion to the eighth flow path 30h.

In the cooling apparatus of the hybrid vehicle according to the fifth modified example of the present invention, when the circulation of the cooling water is stopped due to the engine stop, the temperature of the coolant in the water jacket 25 for the internal combustion engine 11, which is maintained at a relatively high temperature, increases, which causes convection (that is, transfer of heat) in the flow path of the coolant. Even if the relatively high temperature coolant caused by the convection approaches U tubes 30k and 30k from the internal combustion engine 11, convection of the coolant towards downward in the vertical direction (that is, heat transfer towards vertically downward) is suppressed, so that the heat from the internal combustion engine is prevented from transferring to the PDU 14 and the downverter 15, which are disposed between two U tubes. Accordingly, it is possible to prevent the PDU 14 and the downverter 15 from temperature rise exceeding the predetermined management temperature.

In the fifth modified example, two U tubes are provided at an upstream position of the PDU 14 and at a downstream position of the downverter 15. However, the configuration is not limited to this, and it is possible to provide one U tube at a position upstream of the PDU 14 and the downverter 15 or at a position downstream of the second thermostat 24.

Figure 8:
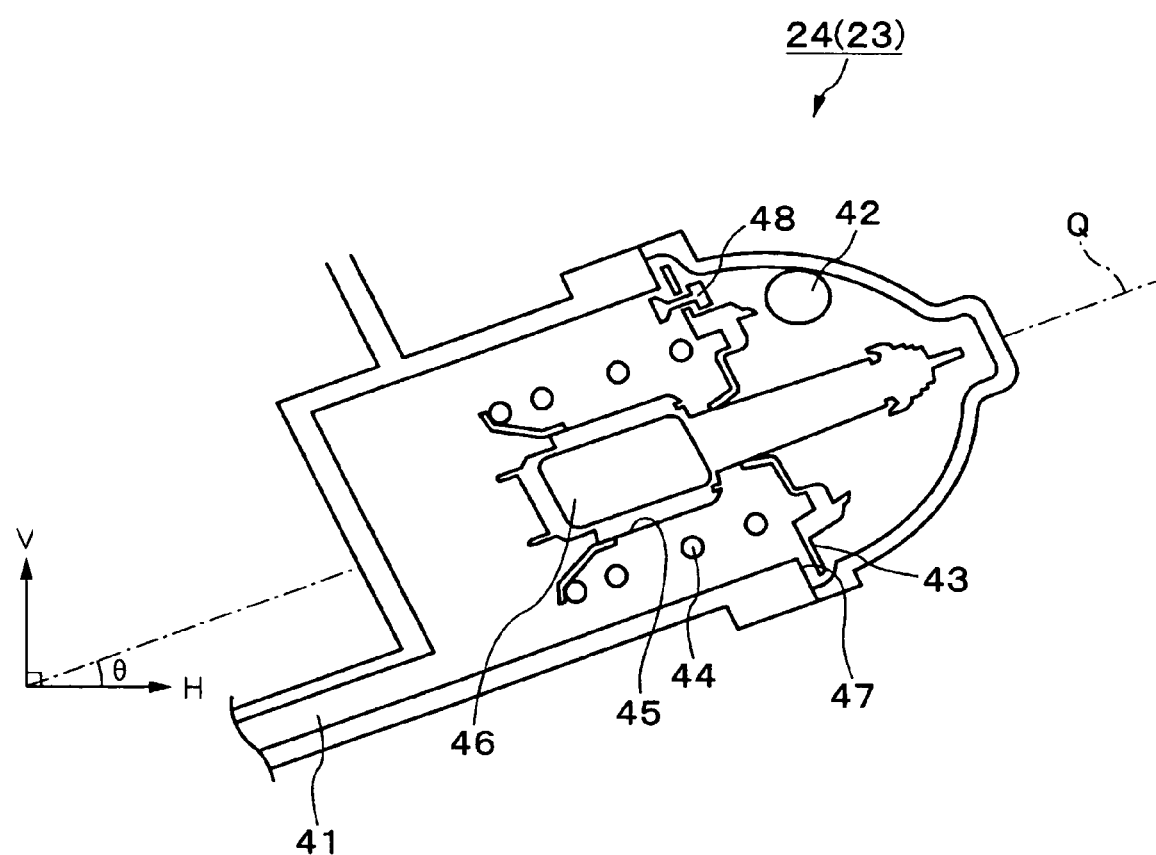
FIG. 8 is a cross sectional view of a thermostat of a cooling apparatus for a hybrid vehicle according to a fifth modified example of the present embodiment.

In the cooling apparatus 10 according to the fifth modified example, the thermostats 23 and 24 are what is called wax type thermostat, which, as shown in FIG. 8, comprises an inlet flow path 41 for introducing the coolant, an outlet flow path 42 for discharging the coolant, a valve element 43 for intercepting the coolant flowing between the inflow path 41 and a discharge flow path 42, a spring 44, a pellet 45 supported movably in the direction along an axis Q, a wax (actuator element) 46 received in the pellet 45, a contact portion 47, with which the valve element 43 contacts when the flow path is intercepted, and a regulating member 48 for regulating the movement of the valve element 43.

The valve element 43 is integrally connected with the pellets 45 receiving the wax 46, and the spring 44 biases the pellet 45 in the closing direction along the Q axis (that is, the valve element 43 moves in a direction of contacting with the contact portion 47). The wax 46, acting as the actuator, expands or contracts in response to the temperature of the coolant.

When the wax 46 is in the contracting state, the valve element 43 contacts the contact portion 47 by the biasing force of the spring 44 so that the valve is rendered in the closed state. In contrast, when the wax 46 expands, the wax 46 moves the pellet 45 in the valve opening direction opposing to the biasing force of the spring 44 (that is, the valve element 43 is moved in a direction of separating from the contact portion 47).

Accordingly, when the coolant temperature is relatively low, both thermostat 23 and 24 are in open state, and when, for example, the engine is started, the coolant does not circulate and the internal combustion engine can be warming up.

Note that both thermostat 23 and 24 are disposed such that their axis directions are inclined at a predetermined angle θ for the horizontal plane, so that the inlet flow path 41 is located at a lower position than the vertical position of the outlet flow path 42.

The above configuration makes it possible to discharge a gaseous inclusion from the outlet flow path 42 without being stagnant in the thermostats 23 and 24, even if a gaseous inclusion is introduced in the coolant.

As described above, according to the cooling apparatus for a hybrid vehicle of the present invention, when controlling the temperature state by flowing common coolant through the internal combustion engine and the motor control device, by setting the management temperatures which are set for the internal combustion engine and the motor control device to mutually different temperatures by means of the temperature setting device, it is possible to perform appropriate temperature management for each of the internal combustion engine and the motor control device, while preventing complexity of the apparatus structure.

Moreover, according to the second aspect of the cooling apparatus for a hybrid vehicle of the present invention, multiple cooling targets, for example the temperature states of the internal combustion engine and the motor control device, can be easily controlled to a desired management temperature by a single radiator.

Furthermore, according to the third aspect of the cooling apparatus for a hybrid vehicle of the present invention, coolant can be circulated with respect to both the internal combustion engine and the motor control device by a common water pump, and the apparatus structure can be simplified.

Also, according to the fourth aspect of the cooling apparatus for a hybrid vehicle of the present invention, by arranging a plurality of thermostats whose induction temperatures differ from each other, in predetermined positions in the cooling circuit, coolant at the desired temperature can be flowed through the desired flow paths, and the internal combustion engine and the motor control device can be more or less independently controlled to each of the desired management temperatures.

Moreover, according to the fifth aspect of the cooling apparatus for a hybrid vehicle of the present invention, for example when warming up the internal combustion engine and so on, by setting the first thermostat and the second thermostat to a closed state, the coolant circulates bypassing the radiator, and the amount of time required to raise the internal combustion engine to the desired temperature can be shortened.

Furthermore, according to the sixth aspect of the cooling apparatus for a hybrid vehicle of the present invention, for example when warming up the internal combustion engine and so on, by setting the first thermostat and second thermostat to a closed state, because the coolant circulates bypassing the radiator and the motor control device, any increase in thermal capacity in the system through which the coolant flows is suppressed, so that the amount of time required when raising the internal combustion engine to the desired temperature can be shortened even further.

Moreover, according to the seventh aspect of the cooling apparatus for a hybrid vehicle of the present invention, for example when warming up the internal combustion engine and so on, by supplying the internal combustion engine with coolant which is of a relatively high temperature due to heat exchange with the operating motor, the internal combustion engine can be raised to the desired temperature much earlier. Also, temperature management of the motor control device can be accurately performed, and for example the occurrence of overheating can be reliably prevented.

Furthermore, according to the eighth aspect of the cooling apparatus for a hybrid vehicle of the present invention, for example when warming up the internal combustion engine and so on, by supplying the internal combustion engine with coolant which is of a relatively high temperature due to heat exchange with the operating motor control device and motor, the internal combustion engine can be raised to the desired temperature earlier. Also, for example even if localized overheating occurs inside the motor control device or the motor due to limited flow at the second thermostat and so on, by increasing the amount of coolant flowing through the bypass flow path, each of the temperature distributions inside the motor control device and the motor can be evened out.

Moreover, according to the ninth aspect of the cooling apparatus for a hybrid vehicle of the present invention, the influence of the temperature state of the internal combustion engine on the operating state of the second thermostat can be suppressed, and the open/closed state of the second thermostat can be controlled to an appropriate timing.

Furthermore, according to the tenth aspect of the cooling apparatus for a hybrid vehicle of the present invention, elimination of the need to provide a bypass flow path and so on to connect the supply flow path to the second flow path enables simplification of the apparatus structure.

In addition, according to the above-described aspect of the apparatus for a hybrid vehicle of the present invention, although the second thermostat 24 is disposed downstream of the of the motor 12 in the eighth flow path 30h, the second thermostat 24 can be, not limited to the above described position, disposed downstream of respective heat sinks 14a and 14b of PDU 14 and the downverter 15, similarly to the first modified example.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A cooling apparatus for a hybrid vehicle, the hybrid vehicle comprising:
    an internal combustion engine for driving the hybrid vehicle;
    a motor as a power source for driving the hybrid vehicle together with the internal combustion engine, and
    a motor control device for controlling an operation of the motor; and
    the cooling apparatus for the hybrid vehicle comprising:
    a cooling circuit for cooling said internal combustion engine and said motor control device by a common coolant, and cooling said coolant by radiating heat using a radiator, said cooling circuit including,
    a first flow path, through which coolant for cooling the internal combustion engine flows, and
    a second flow path, through which the coolant for cooling the motor control device flows, branched from the first flow path at a location inside of the radiator, further the second flow path is again merged into the first flow path downstream of the motor control device, and the merged coolant is circulated by a water pump provided downstream of the merged portion,
    the cooling apparatus for the hybrid vehicle further comprising:
    a temperature setting device in which the coolant circulating in the second flow path which is branched from the first flow path at the location inside of the radiator is further cooled, and thereby a management temperature of the coolant at said internal combustion engine and a management temperature of the coolant at said motor control device are independently set.

2. A cooling apparatus for a hybrid vehicle according to claim 1, wherein the cooling apparatus comprises a radiator provided with a plurality of flow paths for radiating heat of said internal combustion engine and said motor control device, and the temperature setting device sets said management temperatures independently by flowing the coolant through each of said first flow path and said second path.

3. A cooling apparatus for a hybrid vehicle according to claim 1 or claim 2, wherein an output shaft of said internal combustion engine and an output shaft of said motor are mechanically connected.

4. A cooling apparatus for a hybrid vehicle according to claim 1, wherein the cooling apparatus comprises a plurality of thermostats having operation temperatures different from each other, and said management temperatures are independently set at different temperatures by means of said plurality of thermostats.

5. A cooling apparatus for a hybrid vehicle,
    the hybrid vehicle comprising:
    an internal combustion engine for driving the hybrid vehicle;
    a motor as a power source for driving the hybrid vehicle together with the internal combustion engine; and
    a motor control device for controlling an operation of the motor,
    the cooling apparatus for the hybrid vehicle comprising:
    a cooling circuit for cooling said internal combustion engine and said motor control device by a common coolant;
    a circulation path having a water jacket provided in an interior of said internal combustion engine and a water pump which circulates said coolant to said water jacket;
    a radiator having a plurality of flow paths constituting different flow paths for said coolant;
    a supply path which branches from said circulation path downstream of said water jacket for flowing said coolant to said radiator;
    a first flow path for flowing said coolant to said circulation path from said radiator through a first thermostat which has an operation temperature set relatively high;
    a second flow path for flowing said coolant to said circulation path from said radiator through a second thermostat which has an operation temperature set relatively low, and also supplies said coolant to said motor control device; and
    a bypass flow path which connects said supply flow path to a position downstream of said second thermostat of said second flow path.

6. A cooling apparatus for a hybrid vehicle according to claim 5, wherein said second thermostat is disposed at a position downstream of said motor control device.

7. A cooling apparatus for a hybrid vehicle according to claim 6, wherein
    said motor is arranged in a position downstream of said motor control device in said second flow path, and
    said second thermostat is arranged in a position between said motor control device and said motor and is connected to said bypass flow path.

8. A cooling apparatus for a hybrid vehicle according to claim 5, wherein said second thermostat is arranged at a position upstream of said motor control device.

9. A cooling apparatus for a hybrid vehicle according to claim 1,
    the hybrid vehicle comprising:
    an internal combustion engine for driving the hybrid vehicle;
    a motor as a power source for driving the hybrid vehicle together with the internal combustion engine; and
    a motor control device for controlling an operation of the motor,
    the cooling apparatus for the hybrid vehicle comprising:

a cooling circuit for cooling said internal combustion engine and said motor control device by a common coolant;
a circulation path having a water jacket provided in an interior of said internal combustion engine and a water pump which circulates said coolant to said water jacket;
a radiator having a plurality of flow paths constituting different flow paths for said coolant;
a supply path which branches off from said circulation path at a position downstream of said water jacket and which flows said coolant to said radiator;
a first flow path which flows said coolant to said circulation path from said radiator through a first thermostat which has a relatively high operation temperature;
a second flow path which flows said coolant to said circulation path from said radiator via a second thermostat which has a relatively low operation temperature, and also supplies said coolant to said motor control device; and
a bypass flow path which connects, upstream of said water jacket, said circulation path at a position between said water pump and said water jacket to said second flow path at a position downstream of said second thermostat.

10. A cooling apparatus for a hybrid vehicle, the hybrid vehicle comprising:
an internal combustion engine for driving the hybrid vehicle;
a motor as a power source for driving the hybrid vehicle together with the internal combustion engine; and
a motor control device for controlling an operation of the motor,
the cooling apparatus for the hybrid vehicle comprising:
a cooling circuit for cooling said internal combustion engine and said motor control device by a common coolant;
a circulation path having a water jacket provided in an interior of said internal combustion engine and a water pump which circulates said coolant to said water jacket;
a radiator having a plurality of flow paths constituting different flow paths for said coolant;
a supply path which branches from said circulation path at a position downstream of said water jacket and which supplies said coolant to said radiator;
a first flow path which flows said coolant to said circulation path from said radiator through a first thermostat which has a relatively high operation temperature; and
a second flow path which flows said coolant to said circulation path from said radiator through a second thermostat which has a relatively low operation temperature, and also supplies said coolant to said motor control device; and
said second thermostat is disposed in said circulation path.

* * * * *